Figure 1:
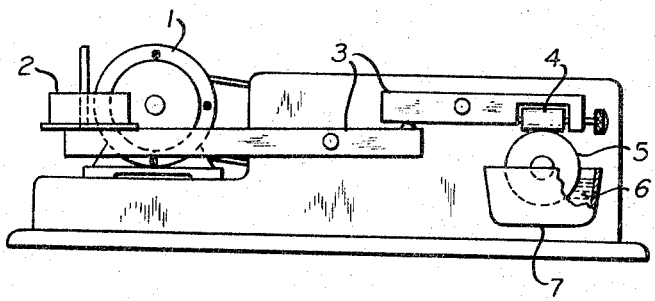

May 9, 1967     SOHEI TAMAKI     3,318,135
METHOD OF MEASURING THE DYNAMIC CORROSIVENESS OF LUBRICATING
MATERIALS IN LIQUID FORM FOR METALS
Filed June 26, 1964

INVENTOR
SOHEI TAMAKI
BY
ATTORNEY.

United States Patent Office 3,318,135
Patented May 9, 1967

3,318,135
METHOD OF MEASURING THE DYNAMIC CORROSIVENESS OF LUBRICATING MATERIALS IN LIQUID FORM FOR METALS
Sohei Tamaki, 7–51 Kodan Jutaku, 73 Shinohara-machi, Kohoku-ku, Yokohama, Japan
Filed June 26, 1964, Ser. No. 378,122
6 Claims. (Cl. 73—10)

This is a continuation-in-part application to the co-pending patent application Ser. No. 106,286, filed Apr. 28, 1961, and now abandoned.

The present invention relates to a method of measuring the corrosiveness of lubricating materials in liquid form for metals.

Heretofore, methods of measuring the corrosiveness of lubricating materials in liquid form for metals have been effected usually by the indirect measuring methods, such as (1) a method of the measurement of the acid number of the lubricating materials in liquid form and (2) a method of comparison through the discoloration of a copper plate in the lubricating materials in liquid form and the like. However, such static corrosive test methods do not necessarily always bring about the practical results in use, and the extreme case has resulted in the reverse phenomenon with extreme inaccuracy.

Dynamic testing methods of lubricants are known, however, which are designed to determine the frictional coefficient, the anti-flux property, the load-carrying property and the frictional wear by observing the seizure or flux, heat and collision.

While, as stated above, corrosive wear of a lubricant has been tested by insufficient static means, it is the main object of the present invention to provide for the first time a method which permits testing of corrosive wear, caused by chemical corrosiveness of a lubricant under dynamic lubricating conditions.

It is another object of the present invention to provide a method for determing the corrosive wear property of liquid lubricating materials comprising the steps of selecting a corrosive sensitive metal test piece from the group consisting of copper and corrosive sensitive non-ferrous metals and alloys, selecting a metal member relatively harder than the test piece, movingly contacting the test piece with the metal member and continuously lubricating the contacting surfaces thereof with a liquid lubricating material thereby producing a wear scar on the test piece, simultaneously applying to the contacting surfaces of the movingly contacting test piece and member pressure of a magnitude, such that frictional wear is negligible in comparison to corrosive wear, and measuring the scar.

The known dynamic testing methods are concerned only with the measurement of the "Extreme Pressure Property" of lubricants to establish the frictional coefficient, the anti-flux property, the load-carrying property and the frictional and mechanical wear. The known methods apply a test piece made of steel, ferrous metals and alloys, to withstand comparatively high normal pressures which are provided and which are proportional to frictional wear.

In the method according to the present invention, however, only non-ferrous metals or alloys, preferably copper, are used for instead, measuring corrosive wear.

For example, in an experiment performed by the inventor according to the known friction wear testing methods, weights of 50 to 150 kg. have been applied, which corresponds with a specific pressure of 15,000 kg./cm.$^2$ (210,000 lb./in.$^2$) for the measuring of the "E. P. Property."

In a comparison experiment performed by the inventor for a corrosion wear test in accordance with the present invention a weight of 1.0 kg. has been applied which corresponds with a specific pressure of 10 kg./cm.$^2$. It appears, therefore, that the specific pressure applied in the present method is about 1/1500 of the specific pressure applied in the known frictional tests and accordingly the frictional wear is reduced by the same factor, and, with a corrosive sensitive test piece such as copper or other non-ferrous materials and alloys, frictional wear becomes negligible in comparison to corrosive wear.

In order to determine the "E. P. Property" with the known methods a gradual increase of the applied load is required until the critical weight is obtained, so that a great number of weights is required in order to reach the critical weight. On the other hand, in accordance with the present method, a single, predetermined weight is applied, which is not increased during the testing procedure.

Commensurate with the increasing friction during the testing procedure an electric motor having 2 to 3 H.P. is required for performing the known frictional tests, while it has been found that due to the appreciable reduced specific pressure applied in the present method an electric motor of $1/40$ H.P. or less will suffice.

It has been found that according to the known lubricant evaluation and testing methods any lubricant containing active or corrosive material, such as sulphur, phosphorus, chlorine or esters, indicates satisfactory and even excellent results in the friction tests. Yet surprisingly these same materials show, without exception very poor and entirely unsatisfactory results in the present method testing the dynamic corrosion properties.

Figure 2:
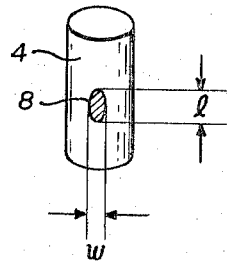

With these and other objects in view, which will become apparent in the following detailed description, the present invention will be clearly understood in connection with the accompanying drawing, in which:

FIGURE 1 shows one example of apparatus which can be used for carrying out a method in accordance with the present invention; and FIG. 2 is a front elevation of a roller shaped test piece used in the testing operation of the present invention, showing a corrosion scar produced on the circumferential surface of the test piece.

Referring now to the drawing, an electric motor 1 of $1/40$ H.P. is provided, which has a number of revolutions of about 700 r.p.m. A weight 2 and lever 3 are arranged so that the total load exerted on the sliding surfaces of a test piece 4 and a rotor 5 becomes 1 kg. The test piece 4 is made of electrolytic copper or other non-ferrous metal, while steel or steel alloys cannot be used.

The rotor 5 is made of carbon steel having a Shore hardness of about 75 and a diameter of about 35 mm., rotating in an oil casing 6 and receiving lubricating material 7 in liquid form.

In the case of using the test piece 4 of copper, which is a preferred material, by the illustrated apparatus, the test piece 4 is pressed against the surface of the rotor 5 and the rotation of the rotor 5 is continued for 2 minutes. Then, on the surface of the test piece 4, a scar 8 of corrosion wear is produced as shown in FIG. 2, and consequently, a size of the scar 8 of corrosion wear is shown having a length $l$ and a width $w$ and, thereby, the corrosiveness of various lubricating materials in liquid form for metals can be measured by a comparing operation.

A part of the results of the measurement for the various lubricating materials in liquid form by the above mentioned method is as follows:

| Kind of lubricating materials in liquid form | A size of a scar of corrosion wear on the test piece of copper | |
|---|---|---|
| | Length, mm. | Width, mm. |
| Water | 6.0 | 3.0 |
| Water insoluble cutting oil (contains sulfur) | 6.7 | 3.4 |
| Water soluble cutting oil (contains chlorine) | 6.7 | 3.4 |
| H.D. type No. 30 motor oil | 7.0 | 3.8 |
| Do | 6.7 | 3.4 |
| Purified No. 60 spindle oil | 5.0 | 2.6 |
| Purified No. 20 machine oil | 5.5 | 2.8 |
| Regular type purified No. 30 motor oil | 5.0 | 2.6 |
| Multigrade type No. 10-30 motor oil | 6.7 | 3.4 |
| No. 90 gear oil | 8.0 | 4.1 |
| Castor oil | 8.4 | 4.5 |
| Rape seed oil | 8.3 | 4.4 |
| H.D. type No. 450 Diesel engine oil | 7.1 | 3.8 |
| Polyalkylene glycol ester | 7.2 | 3.9 |
| Tricresyl phosphate | 7.0 | 3.8 |
| Carbon tetrachloride | 7.2 | 3.9 |

In the above measured results, the purified lubricating materials in liquid form of a petroleum origin not including an additive agent shows best results. The lubricating materials in liquid form including the so-called high class additive sold on the market, especially an oiliness improver or an extreme pressure agent presents poor results, and in comparison with the size of the wear scar, the worst lubricating materials in liquid form show a wear scar nearly six times of that of the best one.

Especially, of interest is the fact that the existence of corrosive material such as hydroxyl group, a carboxyl group, sulphur, chlorine, phosphorus and the like in the lubricating materials in liquid form becomes clear in the present method, and that the so-called high class lubricating materials in liquid form sold on the market surprisingly do not necessarily show a superior result. Also the result is shown in comparison with a testing result of steel to steel by the known various friction testing machines, such as a four-balls type, a Timken type, a pendulum type, a dual lever type and the like.

In brief, the method of measuring the dynamic corrosiveness of lubricating materials in liquid form for metals in accordance with the present invention provides a new and useful means of evaluating lubricating materials in liquid form for internal combustion engines, electric machines, turbines and the like composed of the combination of various metals.

While I have disclosed one embodiment for performing the method of the present invention, it is to be understood that this embodiment is given by example only and not in a limiting sense, the scope of the present invention being determined by the objects and the claims.

1. A method for determining the corrosive wear property of liquid lubricating materials comprising the steps of
   selecting a corrosive sensitive metal test piece from the group consisting of copper and corrosive sensitive non-ferrous metals and alloys,
   selecting a metal member relatively harder than said test piece,
   movingly contacting said test piece with said metal member and continuously lubricating the contacting surfaces thereof with a liquid lubricating material thereby producing a wear scar on said test piece,
   simultaneously applying to said contacting surfaces of said movingly contacting test piece and metal member pressure of a magnitude such that frictional wear is negligible in comparison to corrosive wear, and
   measuring said scar.
2. The method as set forth in claim 1, wherein said test piece is roller shaped.
3. The method as set forth in claim 2, wherein said metal member is a rotor and rotates in peripheral contact with said test piece.
4. The method as set forth in claim 3, wherein said test piece is copper.
5. The method as set forth in claim 4, wherein said metal member is carbon steel.
6. The method as set forth in claim 5, wherein said metal member is positioned below said test piece and is partly immersed in a reservoir of said liquid lubricating material.

References Cited by the Examiner
UNITED STATES PATENTS

| 2,097,716 | 11/1937 | Benz | 73—10 |
| 2,910,863 | 11/1959 | Hornbostel et al. | 73—86 |
| 3,045,471 | 7/1962 | Chapman et al. | 73—10 X |
| 3,060,721 | 10/1962 | Marsh et al. | 73—7 X |

DAVID SCHONBERG, *Primary Examiner.*